(12) United States Patent
Moosberg et al.

(10) Patent No.: US 11,407,180 B2
(45) Date of Patent: Aug. 9, 2022

(54) SUPPORT EDIFICE FOR THREE-DIMENSIONAL PRINTING

(71) Applicant: Desktop Metal, Inc., Burlington, MA (US)

(72) Inventors: Mats Moosberg, Torslanda (SE); Alexander C. Barbati, Melrose, MA (US)

(73) Assignee: Desktop Metal, Inc., Burlington, MA (US)

(*) Notice: Subject to any disclaimer, the term of this patent is extended or adjusted under 35 U.S.C. 154(b) by 0 days.

(21) Appl. No.: 16/403,294

(22) Filed: May 3, 2019

(65) Prior Publication Data

US 2019/0337235 A1  Nov. 7, 2019

Related U.S. Application Data

(60) Provisional application No. 62/676,331, filed on May 25, 2018, provisional application No. 62/668,281, (Continued)

(51) Int. Cl.
*B32B 3/02* (2006.01)
*B29C 64/40* (2017.01)
(Continued)

(52) U.S. Cl.
CPC ........... *B29C 64/40* (2017.08); *B22F 3/24* (2013.01); *B22F 10/00* (2021.01); *B22F 10/10* (2021.01);
(Continued)

(58) Field of Classification Search
CPC ......... B33Y 10/00; B33Y 30/00; B33Y 70/00; B33Y 80/00; B29C 64/40
See application file for complete search history.

(56) References Cited

U.S. PATENT DOCUMENTS 5,121,329 A  6/1992  Crump
5,260,009 A  11/1993  Penn
(Continued)

FOREIGN PATENT DOCUMENTS

CN  105834360 B  8/2016
CN  106694880 A  5/2017
(Continued)

OTHER PUBLICATIONS

International Search Report, PCT/2019/030701, dated Aug. 16, 2019.
(Continued)

*Primary Examiner* — Elizabeth E Mulvaney
(74) *Attorney, Agent, or Firm* — Oak Law, PLLC; Jonathan D. Hall

(57) ABSTRACT

This invention relates to three-dimensional printing. This invention in particularly relates to a method of fabricating a three-dimensional object using a support edifice and also using a mold material with structural additives. The support edifice is fabricated in the same crafting material as the final three-dimensional object in the same manner as the printing of the final three-dimensional object (mold and crafting in a layer by layer manner). This method enables the support edifice to also transform during post processing in the same manner as the final three-dimensional object, thus supporting the object until finished. The system for fabricating the object comprises a dual printhead comprising a first dispensing nozzle for depositing the filament material in a flowable fluid form and a second dispensing nozzle for depositing the crafting medium, which is in a paste form. The printhead can also include a heating system or a drying apparatus. The three-dimensional imaging process for making objects, preferably metal objects or ceramic objects, on a layer-by-layer basis under the control of a data processing
(Continued)

system is disclosed. The printing of the three-dimensional object such as heavy objects or an object having different parts having a very thin gap or space. It is important to use different processing steps and/or material to print such three-dimensional objects. The present invention provides a solution by printing a support edifice comprising a special structural additive for the mold, and further the support edifice can be printed simultaneously while printing the mold and crafting-paste material on a layer-by-layer basis. The mold material is mixed with the structural additive. The structural additive is useful for prohibiting either fusing of the object with the support edifice, or in alternative embodiments, the fusing of one part of an object with another part of an object.

20 Claims, 5 Drawing Sheets

Related U.S. Application Data filed on May 8, 2018, provisional application No. 62/668,279, filed on May 8, 2018, provisional application No. 62/666,719, filed on May 4, 2018, provisional application No. 62/666,798, filed on May 4, 2018.

(51) Int. Cl.
| | |
|---|---|
| *B33Y 10/00* | (2015.01) |
| *B33Y 70/00* | (2020.01) |
| *B28B 1/00* | (2006.01) |
| *B33Y 80/00* | (2015.01) |
| *B29C 64/165* | (2017.01) |
| *B33Y 30/00* | (2015.01) |
| *B29C 64/209* | (2017.01) |
| *B28B 11/24* | (2006.01) |
| *B22F 10/10* | (2021.01) |
| *B29C 64/393* | (2017.01) |
| *B22F 10/00* | (2021.01) |
| *B22F 3/24* | (2006.01) |
| *B33Y 40/00* | (2020.01) |
| *B29K 509/02* | (2006.01) |
| *B29K 505/00* | (2006.01) |
| *B29K 507/04* | (2006.01) |

(52) U.S. Cl.
CPC ............ *B28B 1/001* (2013.01); *B28B 11/243* (2013.01); *B29C 64/165* (2017.08); *B29C 64/209* (2017.08); *B29C 64/393* (2017.08); *B33Y 10/00* (2014.12); *B33Y 30/00* (2014.12); *B33Y 40/00* (2014.12); *B33Y 70/00* (2014.12); *B33Y 80/00* (2014.12); *B22F 2998/10* (2013.01); *B29K 2505/00* (2013.01); *B29K 2507/04* (2013.01); *B29K 2509/02* (2013.01)

(56) References Cited

U.S. PATENT DOCUMENTS

| | | | |
|---|---|---|---|
| 5,286,767 A | 2/1994 | Rohrbach et al. | |
| 5,977,230 A | 11/1999 | Yang et al. | |
| 6,008,281 A | 12/1999 | Yang et al. | |
| 6,113,969 A | 9/2000 | Bodor et al. | |
| 6,171,360 B1 | 1/2001 | Suzuki et al. | |
| 6,262,150 B1 | 7/2001 | Behi et al. | |
| 6,309,711 B1 | 10/2001 | Tseng et al. | |
| 6,770,114 B2 | 8/2004 | Bartone et al. | |
| 8,459,280 B2 | 6/2013 | Swanson et al. | |
| 8,475,946 B1 | 7/2013 | Dion et al. | |
| 8,827,684 B1 | 9/2014 | Schumacher et al. | |
| 9,183,325 B2 | 11/2015 | Wighton et al. | |
| 9,815,118 B1 | 11/2017 | Schmitt et al. | |
| 9,833,839 B2 * | 12/2017 | Gibson | B29C 64/264 |
| 2001/0050031 A1 | 12/2001 | Bredt et al. | |
| 2002/0195747 A1 | 12/2002 | Hull et al. | |
| 2004/0173946 A1 | 9/2004 | Pfeifer et al. | |
| 2004/0217186 A1 | 11/2004 | Sachs et al. | |
| 2005/0258577 A1 | 11/2005 | Holowczak et al. | |
| 2008/0042321 A1 | 2/2008 | Russell et al. | |
| 2008/0124475 A1 | 5/2008 | Kritchman | |
| 2008/0135721 A1 | 6/2008 | Wang et al. | |
| 2011/0129640 A1 | 6/2011 | Beall et al. | |
| 2012/0193841 A1 | 8/2012 | Wang et al. | |
| 2014/0291886 A1 | 10/2014 | Mark et al. | |
| 2015/0174824 A1 | 6/2015 | Gifford et al. | |
| 2015/0314528 A1 | 11/2015 | Gordon | |
| 2015/0314532 A1 | 11/2015 | Gordon | |
| 2016/0107385 A1 | 4/2016 | Takahashi et al. | |
| 2016/0184891 A1 | 6/2016 | Mironets | |
| 2016/0256918 A1 | 9/2016 | Schilling | |
| 2016/0299494 A1 | 10/2016 | Church et al. | |
| 2016/0325498 A1 | 11/2016 | Gelbart | |
| 2016/0332388 A1 | 11/2016 | Park et al. | |
| 2017/0173688 A1 | 6/2017 | Miyashita | |
| 2017/0246760 A1 | 8/2017 | Colombo et al. | |
| 2017/0297109 A1 | 10/2017 | Gibson et al. | |
| 2018/0311733 A1 * | 11/2018 | Zafar | B29C 64/386 |
| 2019/0126509 A1 | 5/2019 | Gelbart | |
| 2019/0168300 A1 | 6/2019 | Gelbart | |
| 2019/0337053 A1 * | 11/2019 | Moosberg | B33Y 30/00 |

FOREIGN PATENT DOCUMENTS

| | | |
|---|---|---|
| EP | 3301597 A1 | 4/2018 |
| IN | 201621002997 A | 2/2016 |
| JP | 2016-150510 A | 8/2016 |
| SE | 1500245 C2 | 11/2016 |
| WO | WO2002045889 A2 | 6/2002 |
| WO | 2004-009858 A1 | 1/2004 |
| WO | WO2015171639 A1 | 11/2015 |
| WO | 2016-136166 A1 | 9/2016 |
| WO | 2017-151837 A1 | 9/2017 |
| WO | WO2018200512 A1 | 11/2018 |

OTHER PUBLICATIONS

International Search Report, PCT/US2019/030702, dated Aug. 16, 2019.

International Search Report, PCT/US2019/030705, dated Aug. 16, 2019.

International Search Report, PCT/US2019/030707, dated Aug. 20, 2019.

International Search Report, PCT/US2019/030709, dated Aug. 12, 2019.

Godbey, B., Master's Degree Thesis entitled "Surface Finish Control of 3D Printed Metal Tooling", Clemson University, Dec. 2007.

* cited by examiner

SUPPORT EDIFICE FOR THREE-DIMENSIONAL PRINTING

FIELD OF THE INVENTION

The present invention generally relates to the field of three-dimensional printing. The invention particularly relates to a material and a method of making three dimensional objects using a support edifice, wherein a mold (also "mould") material or filament material is mixed with a structural additive. The structural additive prohibits the fusing of the individual parts of object. The invention further relates to a system of making three-dimensional ("3D") objects using a support edifice.

BACKGROUND OF THE INVENTION

Three-dimensional printers are used to build solid models by performing layer by layer printing of a building material. The building material can be of different forms, such as a liquid or a semiliquid at the three-dimensional printhead. For example, a solid material can be heated and then extruded from a three-dimensional printer nozzle. The layers of building materials can be solidified on a substrate. Three-dimensional printer systems can use a fused filament fabrication (FFF) process (sometimes called fused deposition modeling (FDM) process) in which a filament is moved by a filament moving mechanism, toward a heated zone. The filament can be melted and extruded on a platform to form a three-dimensional object. The melted filament can adhere to the walls of the heated printhead, resulting in deformed printed lines. A commercially available FFF system uses a heated nozzle to extrude a melted material such as a plastic wire. The starting material is in the form of a filament which is being supplied from a spool. The filament is introduced into a flow passage of the nozzle and is driven to move like a piston inside this flow passage. The front end, near the nozzle tip, of this piston is heated to become melted. The rear end or solid portion of this piston pushes the melted portion forward to exit through the nozzle tip. The nozzle is translated under the control of a computer system in accordance with previously generated computer-aided design ("CAD") data that has been sliced into constituent layers.

In fabricating three dimensional objects, such as overhanging objects, heavy objects or objects having cavities or gaps or rafts, it may be necessary to use a supporting structure or support edifice. The support material is deposited from a second nozzle pursuant to the generated geometry during the build process. The support material adheres to the three-dimensional object during fabrication and is subsequently removed from the completed three-dimensional object when the building process is complete.

A number of different types of accessories for three-dimensional printing are described in the prior art. For example, the following patents are provided for their supportive teachings and are all incorporated by reference: Prior art document, U.S. Pat. No. 8,459,280 discloses a support structure removal system. The support structure removal system includes a vessel and a second component (e.g., a reservoir tank and base unit). The vessel includes a vessel body having a top opening configured to retain an aqueous fluid, a porous floor supported by the vessel body being configured to retain a three-dimensional part inserted through the top opening, and an impeller rotatably mounted below the porous floor. The second component includes a surface configured to operably receive the vessel, and a rotation-inducing assembly located below the surface, the rotation-inducing assembly being configured to rotate the impeller with magnetic fields when the vessel is received on the surface of the second component to agitate and direct the flow of the aqueous fluid through the porous floor. However, the prior art document appears to focus only on the system for removing the support structure. The reference does not appear to disclose the formation of a mold or the use of any crafting medium.

Another prior art document, U.S. Pat. No. 9,183,325 discloses a method of generating a support structure for an object, where the support structure and the object are fabricated via one or more additive fabrication techniques. The method comprises identifying one or more regions of the object for which one or more mechanical support are provided, identifying one or more support points within at least a first region of the one or more regions, and generating the support structure for the object, the support structure comprising one or more support tips coupled to the object at the one or more support points. However, this prior art document does not appear to discuss the type of material used for preparing the support tips or the support structure. The reference does not appear to disclose the formation of a mold or the use of any crafting medium.

Yet another prior art document, U.S. Pat. No. 5,121,329 discloses an apparatus for making three-dimensional physical objects of a predetermined shape by sequentially depositing multiple layers of a solidifying material on a base member in a desired pattern. The reference does not appear to disclose the formation of a mold or the use of any crafting medium.

Yet other prior art documents, U.S. Pat. Nos. 9,833,839 and 9,815,118, both disclose similar techniques for fabricating support structures, breakaway layers, and the like suitable for use with sinterable build materials. The technique used in these prior art documents disclose the application of the interface layer by depositing an interface material using a fused filament fabrication process. Forming the interface layer may include at least one of ink jetting, micro pipetting, and painting an interface material onto the first surface to form the interface layer. The interface material may include a ceramic-loaded polymer. The interface material may include a ceramic-loaded suspension or a ceramic-loaded slurry. However, this reference does not appear to discuss the mold building layer and crafting (or secondary layer) paste building layer of the present invention.

Yet another prior art document, SE1500245 to Mats Moosberg discusses a three-dimensional imaging process for making objects, preferably metal objects or ceramic objects, on a layer-by-layer basis under the control of a data processing system. The process also includes the use of a filament material (in the form of a solid that melts to a fluid during the printing process) to build the mold and a crafting medium (in the form of a paste) for filling the hollow mold cavity. The method for building the three-dimensional model by extruding a crafting medium in parallel with a molding material as described in the prior art document, SE1500245, is difficult to use for some heavy geometries or overhanging geometries.

However, the above mentioned references and many other similar references have one or more of the following shortcomings: (a) not discussing a mold forming technique; (b) not discussing the use of building or crafting medium; (c) the prior art three-dimensional-printing methods use a powder clay which is mixed with water and printed out on a layer by layer basis using a syringe to obtain ceramic objects; (d) the resulting ceramic object may have low resolution; (e) finishing of the final three-dimensional printed object is not good; and (f) most of the references appears to use a supporting material which can be removed by dissolving the supporting material.

During three-dimensional printing, for some geometries the resulting object can exhibit deformation during post processing due to the weight and structural phase of the crafting material. This deformation can occur if the object has overhangs or non-supported bridging sections.

A solution to this problem is achieved in the present invention by providing a method of fabricating a three-dimensional object using a support edifice and also using a mold material with one or more structural additives. The support edifice should be fabricated in the same crafting material as the final three-dimensional object in the same manner as the crafting of the final three-dimensional object, i.e. the mold and crafting in a layer by layer manner. This layer by layer construction enables the support edifice to also transform during post processing in the same manner as the final three-dimensional object and provides support until the printing of the object is completed. The support edifice provides enough structure to support the resulting object during post processing such as sintering.

The present application addresses the above-mentioned concerns and short comings with regard to providing an improved system for building overhanging and heavy three-dimensional objects by using a support edifice. Further, the material used for the support edifice is also novel.

SUMMARY OF THE INVENTION

The present invention relates to three-dimensional printing and in particular to a method of fabricating a three-dimensional object using a support edifice and also using a mold material with structural additives. The support edifice is fabricated in the same crafting material as the final three-dimensional object and in the same manner as the printing of the final three-dimensional object. The present methods and compositions enable the support edifice to also transform during post processing in the same manner as the final three-dimensional object, thus supporting the object until finished.

The present invention relates to a support edifice for a three-dimensional object printed from a crafting medium, said support edifice comprising:
  (a) one or more mold layers,
  (b) one or more corresponding crafting medium layers,
  wherein each of the one or more mold layers of (a) substantially contains (that is surrounds) a corresponding crafting medium layer (b) of the support edifice,
  wherein at least one of the mold layers substantially covers one or more contact points (that is the proximity points or regions) of the support edifice with the three-dimensional object, and
  wherein each of the mold layers comprises a structural additive that substantially prevents fusing of the support edifice to the object during subsequent sintering of the object.

In further embodiments the present invention also relates to a support edifice prior to sintering.

In further embodiments the present invention also relates to a support edifice wherein the mold layer comprises a thermoplastic polymer.

In further embodiments the present invention also relates to a support edifice wherein the thermoplastic polymer is selected from the group consisting of poly(propylene), poly(styrene), poly(lactic acid) (PLA), acrylonitrilebutadiene-styrene (ABS), polycarbonate abs (PC-ABS), nylon, poly(carbonate), poly(phenyl sulfone), ultem, poly(ethylene), acrylic [poly(methyl methacrylate)], poly(benzimidazole), poly(ether sulfone), poly(etherether ketone), poly(etherimide), poly(phenylene oxide), poly(phenylene sulfide), poly(vinyl chloride), poly(vinyldiene fluoride), poly(acetal), poly(vinyl acetate), poly(vinyl butyrate), poly(vinyl alcohol), poly(4-hydroxystyrene), poly(vinyl formate), poly(vinyl stearate), poly(acrylamide), poly(caprolactone), chitosan, and combinations thereof.

In further embodiments the present invention also relates to a support edifice wherein the structural additive is selected from the group consisting of metal particles, ceramic particles, charcoal particles and combinations thereof.

In further embodiments the present invention also relates to a support edifice wherein the metal particles are selected from silver, gold, copper, tin, nickel, chromium, zinc, tungsten, cobalt, aluminum, molybdenum, boron, iron, titanium, vanadium, niobium, silicon, manganese, steel, metal alloys, and combinations thereof.

In further embodiments the present invention also relates to a support edifice wherein the ceramic particles are selected from silicon carbide, boron carbide, aluminum carbide, tungsten carbide, titanium carbide, tantalum carbide, silicon nitride, boron nitride, aluminum nitride, titanium nitride, zirconium nitride, steatite, forsterite, alumina, zircon beryllia, magnesia, mullite, cordierite, aluminum titanate, zirconia, and combinations thereof.

In further embodiments the present invention also relates to a support edifice wherein said mold layer has a skin thickness, in other words a mold thickness, from about 0.1 to about 10 mm. This skin or mold thickness is the width of the mold for the mold layer of interest.

In further embodiments the present invention also relates to a support edifice wherein said mold layer has a skin thickness, in other words a mold thickness, from about 0.2 to about 2 mm.

In further embodiments the present invention also relates to a support edifice wherein said mold layer has a skin thickness, in other words a mold thickness, from about 0.5 to about 1 mm.

In further embodiments the present invention also relates to a support edifice wherein said mold layer comprises one or more perforations.

In further embodiments the present invention also relates to a support edifice wherein said perforations have a diameter from about 0.4 mm to about 1 mm.

In further embodiments the present invention also relates to a support edifice wherein the crafting medium comprises:
  (i) from about 40% to about 80% by volume basis of a powder selected from metal powders, ceramic powders, and combinations, thereof;
  (ii) from about 0.5% to about 10% by volume of a binder; and
  (iii) from about 15% to about 60% by volume of an aqueous solvent.

In further embodiments the present invention also relates to a support edifice wherein the crafting medium comprises:
  (i) from about 40% to about 80% by volume basis of a powder selected from metal powders, ceramic powders, and combinations, thereof;
  (ii) from about 0.5% to about 10% by volume of a binder; and
  (iii) from about 15% to about 60% by volume of a non-aqueous solvent.

In further embodiments the present invention also relates to a support edifice wherein the crafting medium comprises:
(i) from about 60% to about 70% by volume basis of a powder selected from metal powders, ceramic powders, and combinations, thereof;
(ii) from about 1% to about 5% by volume of a binder; and
(iii) from about 15% to about 60% by volume of an aqueous solvent.

In further embodiments the present invention relates to a crafting medium wherein said aqueous solvent is selected from water, or water in combination with one or more non-aqueous solvents selected from the group consisting of methanol, ethanol, 1-propanol, 2-propanol, acetone, acetaldehyde, ethyl acetate, C2-C4 diols, glycerol, acetonitrile, C4-alcohols, 2-ethoxyethanol, 2-ethyl hexanol, 1,2-dichloroethane, diisopropyl amine, isoamyl alcohol, propyl acetate, isopropyl acetate, and mixtures thereof. Also, contemplated are azeotropes.

In further embodiments the present invention relates to a crafting medium comprising a non-aqueous solvent instead of an aqueous solvent, such nonaqueous solvents selected from the group consisting of methanol, ethanol, 1-propanol, 2-propanol, acetone, acetaldehyde, ethyl acetate, C2-C4 diols, glycerol, acetonitrile, C4-alcohols, 2-ethoxyethanol, 2-ethyl hexanol, 1,2-dichloroethane, diisopropyl amine, isoamyl alcohol, propyl acetate, isopropyl acetate, and mixtures thereof.

In further embodiments the present invention also relates to a support edifice wherein the crafting medium comprises:
(i) from about 60% to about 70% by volume basis of a powder selected from metal powders, ceramic powders, and combinations, thereof;
(ii) from about 1% to about 5% by volume of a binder; and
(iii) from about 15% to about 60% by volume of a non-aqueous solvent.

In further embodiments the present invention also relates to an object prior to sintering prepared by three-dimensional printing comprising:
(I) a main object body, and
(II) a support edifice,
(i) wherein said main object body (I) comprises:
(Ia) one or more mold layers, and
(Ib) one or more corresponding crafting medium layers, wherein each of the one or more mold layers (Ia) substantially contains (that is surrounds) a corresponding crafting medium layer (Ib) of the main object body; and
(ii) wherein said support edifice (II) comprises
(IIa) one or more mold layers, and
(IIb) one or more corresponding crafting medium layers, wherein each of the one or more mold layers (IIa) substantially contains (that is surrounds) a corresponding crafting medium layer (IIb) of the support edifice,
wherein at least one of the mold layers (IIa) substantially covers one or more contact points (that is the proximity points or regions) of the support edifice with the three-dimensional object,
wherein each of the one or more mold layers (IIa) for the support edifice (IIb) comprises a structural additive that substantially prevents fusing of the support edifice (II) to the main object body (I) during subsequent sintering of the object.

In further embodiments the present invention also relates to a method for three-dimensional printing of a support edifice comprising
(a) depositing a mold layer from a print head,
(b) depositing a layer of a crafting medium with a print head within the confines of the mold layer,
(c) depositing a mold layer that substantially covers one or more contact points (that is the proximity points or regions) of the support edifice with the three-dimensional object;
wherein each of the mold layers comprises a structural additive that substantially prevents fusing of the support edifice to the object during subsequent sintering of the object.

In further embodiments the present invention also relates to a method for three-dimensional printing of an object comprising a support edifice, comprising:
(a) depositing a mold layer from a print head to define a mold for the object and the support edifice,
(b) depositing a layer of a crafting medium with a print head within the confines of the mold layer for the object and the support edifice,
(c) repeating steps (a) and (b) until the final layer of the crafting medium and mold layer is deposited within the confines of the mold for the object and support edifice wherein the mold layer substantially covers the terminal layer of the crafting medium representing the contact point (that is the proximity point or region) for the support edifice with the object and now representing a mold layer for the object;
(d) depositing a further layer of crafting medium within the confines of the mold; and
(e) depositing further layers mold and crafting medium to complete the object.

In further embodiments the present invention also relates to an object prior to sintering prepared by three-dimensional printing comprising two or more separate subobjects:
(I) a first subobject, and
(II) one more additional subobjects,
(i) wherein said first subobject (I) comprises:
(Ia) one or more mold layers, and
(Ib) one or more corresponding crafting medium layers, wherein each of the one or more mold layers (Ia) substantially contains (that is surrounds) a corresponding crafting medium layer (Ib) of the subobject; and
(ii) wherein said one or more additional subobjects (II) comprises
(IIa) one or more mold layers, and
(IIb) one or more corresponding crafting medium layers of the additional subobject,
wherein each of the one or more mold layers (IIa) of the one or more subjects substantially contains (that is surrounds) a corresponding crafting medium layer (IIb) of the one or more subobjects; and
wherein at least one of the mold layers (Ia) or (IIa) substantially covers one or more contact points (that is the proximity points or regions) of the subobject (I) or the one or more additional subobjects (II) with each other and the subobject (I),
wherein each of the one or more mold layers (Ia) or (IIa) comprises a structural additive that substantially prevents fusing of the subobject (I) with the one or more subobjects (II) and with each other during subsequent sintering of the object.

In further embodiments the present invention also relates to a support edifice for a three-dimensional object printed from a crafting medium, said support edifice comprising:
(a) one or more mold layers,
(b) one or more corresponding crafting medium layers, wherein each of the one or more mold layers of (a) substantially contains (that is surrounds) a corresponding crafting medium layer (b) of the support edifice, wherein at least one of the mold layers substantially covers one or more contact points (that is the proximity points or regions) of the support edifice with the three-dimensional object, and wherein said at least one or more of the mold layers that substantially covers one or more contact points (that is the proximity points or regions) of the support edifice with the three-dimensional object comprises a structural additive that substantially prevents fusing of the crafting medium of the support edifice to the crafting medium of the object during subsequent sintering of the object.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2D depicts the target final object after printing, processing, and sintering, and after the removal of the support edifice 203, not shown here. 202B represents the sintered crafting medium. FIG. 2A depicts the object after it has been printed, but before any processing. Both the crafting material 202A and the mold material 201 for both the object and the support edifice 203 are shown. FIG. 2B depicts the object after printing and removal of the mold, leaving the residual structural aid additive on the surfaces of the object and support edifice where the mold layer was previously present. The exploded close up illustration indicates that both the support edifice 203 and the crafted object still have remaining structural additive particles (checkered design 204) present even after the post processing. FIG. 2C depicts the object after sintering with the support edifice being removed from the object. As shown here 202B illustrates that both the support edifice and the desired object have been sintered.

DETAILED DESCRIPTION OF THE INVENTION

Figure 1:
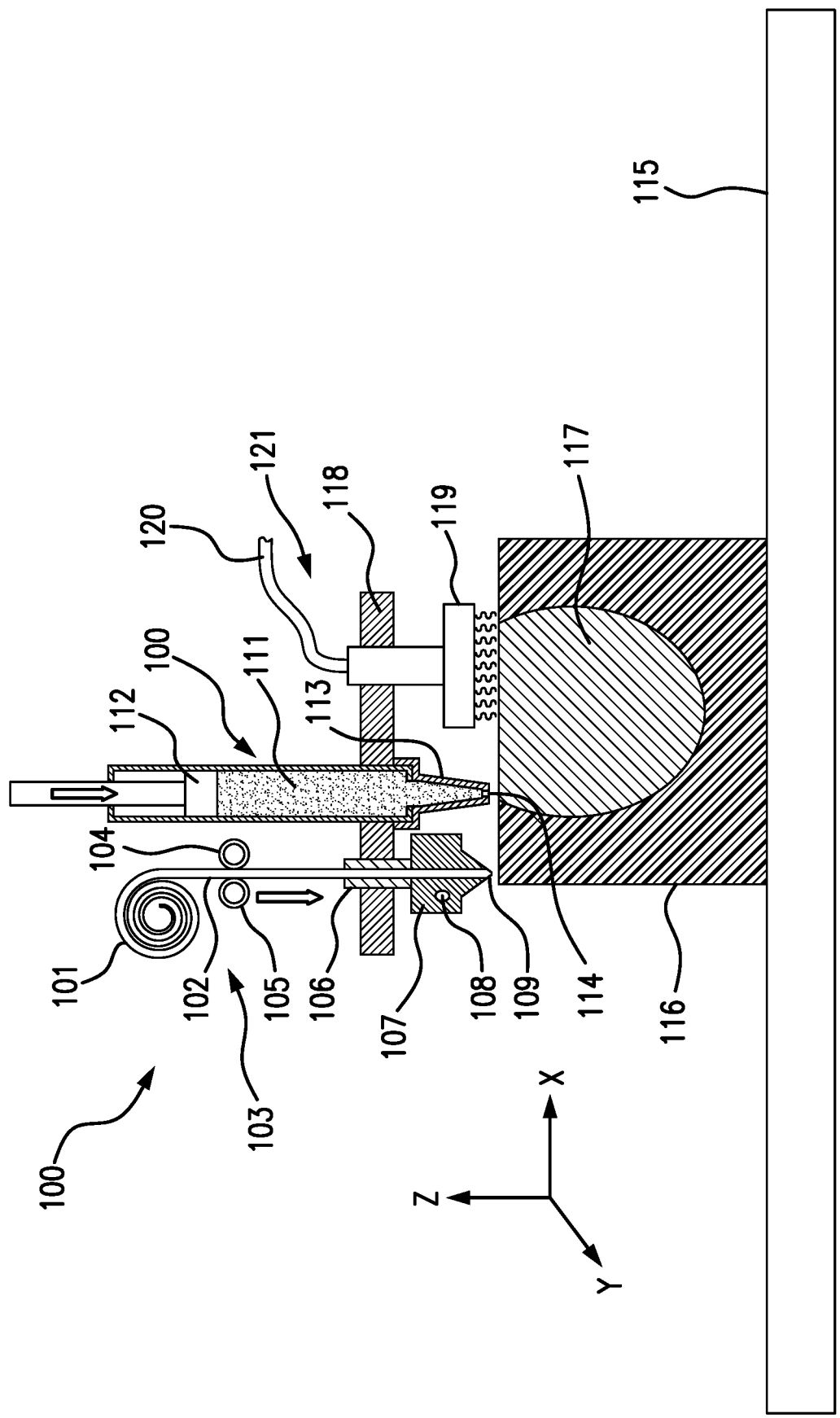
FIG. 1 depicts a schematic representation of the system in accordance with the present invention.

In the view of the foregoing disadvantages inherent in the known types of methods and systems for three-dimensional printing now present in the prior art, the present invention provides an improved method and system for three-dimensional printing of heavy and complex structures using a support edifice. As such, the general purpose of the present invention, which will be described subsequently in greater detail, is to provide a new and improved method and system for three-dimensional printing of heavy and complex structures.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments can be combined, or that other embodiments can be utilized and that structural and logical changes may be made without departing from the spirit and scope of the present invention.

It should be noted that the proximity points or regions are areas where the support edifice and the object, or the subobjects are within a small distance of each other such that there is a risk of fusion of the support edifice with the object or the subobjects with each other during sintering, and which is thereby prevented by the juxtaposition of a mold layer comprising a structural additive.

Three-dimensional printing is evolved from automation production, which started in the early 20th century. It was applied in mechanical model preparation and the automotive industries. Recently, its applications were explored for other industries, including medicine, associated medical industries, construction, aerospace, etc. This accelerated and automated methodology is also promising for civil structures, including building and bridges. Many other industries and applications are also now being developed. However, it is challenging to prepare heavy three-dimensional objects or objects having spaces or overhangs, that require support or a scaffold during construction. Also, it is challenging to prepare objects comprising two or more non-connected but intertwined or interspersed items, e.g. links of a chain that are linked but need to move freely with respect to each other.

A solution to this problem of printing objects requiring support or that have non-connected but interspersed parts is provided in the present patent application. The present patent application is focused on providing a material which is used to prepare a support edifice of scaffold, such as support pillars or other appropriate support structures. In the present invention, the support edifice comprises one or more mold layers and one or more corresponding crafting medium layers. The mold layers comprise structural additives which are added to the support mold material. The support edifice should be fabricated in the same crafting material as the final three-dimensional objects in the same manner as the crafting of the final three-dimensional objects (mold and crafting in layer by layer manner). This enables the support edifice to also transform during post processing in the same manner as the final three-dimensional objects and keep supporting the object until printing and processing are complete. The mold material used for the support edifice and also for the final object in the present invention includes structural additives that prohibit fusing between the parts so that the support edifice is easily separated from the final object. In other embodiments the structural additives are not added to all of the mold layers, but just those mold layers that are in contact with the support edifice and the object; or in those embodiments comprising two or more non-connected, but separate objects, the structural additives can be added just to those mold layers contacting the separate objects during three-dimensional printing.

The mold material can be acrylonitrilebutadiene-styrene (ABS), Polylactic acid (PLA), or any polymeric or plastic material with the structural additive such as metal, charcoal particles, ceramic, or other particles. The filament material is preferably a thermoplastic polymer that softens and liquifies for easy deposition and which rapidly cools and hardens to provide a suitable mold. Thermoplastic polymers useful for forming the mold from the filament material can include the following: poly(propylene), poly(styrene), poly(lactic acid) (PLA), acrylonitrilebutadiene-styrene (ABS), polycarbonate abs (PC-ABS), nylon, poly(carbonate), poly(phenyl sulfone), ultem, poly(ethylene), acrylic [poly(methyl methacrylate)], poly(benzimidazole), poly(ether sulfone), poly (etherether ketone), poly(etherimide), poly(phenylene oxide), poly(phenylene sulfide), poly(vinyl chloride), poly (vinyldiene fluoride), poly(acetal), poly(vinyl acetate), poly (vinyl butyrate), poly(vinyl alcohol), poly(4-hydroxystyrene), poly(vinyl formate), poly(vinyl stearate), poly (acrylamide), poly(caprolactone), chitosan and combinations thereof.

The crafting medium is preferably a commercially available metal clay usually consisting of very small particles of metal such as silver, gold, bronze, or copper mixed with an organic binder and water commonly used in making jewelry, beads and small sculptures.

FIG. 1 depicts a schematic representation of a system for drying a paste based crafting model during three-dimensional printing according to one of the embodiments of the present invention. The system 100 for drying a paste based crafting model during three-dimensional printing comprises: (a) supply arrangement for a filament material 101 for forming a mold layer for the object; (b) an extruder 103; (c) a feeding channel 106; (d) a plurality of nozzles 107 and 113; (e) a plurality of heating elements/systems 108 for melting the filament and 119 for drying the crafting medium; (f) a plurality of discharge orifices 109 and 114; (g) a supply arrangement for a crafting medium 110; (h) an actuator 112 for controlling the flow of the crafting medium; (i) a mold 116 (formed from the layer-by-layer deposition of the filament material); and (j) a platform 115 on which the system of three-dimensional printer is fixed. The system has dual printhead which comprise a first dispensing nozzle 107 for depositing the filament 102 in flowable fluid form by the discharge orifice 109 to supply a filament 102 or a first material layer and a second dispensing nozzle 113 for depositing a crafting medium 111 or the second material layer which is in a paste form by the discharge orifice 114. The system further comprises a holding element 118 which holds a dual printhead and a heating element/system 119.

The system also comprises a filament feeding device comprising a stepper motor (not shown) and idler and driving rollers 104 and 105 located opposite to drive rollers which work together to grip the filament there between and to advance it through a filament feeding channel 106 thereby regulating the flow of filament through the feeding channel. The extruder 103 can be of different types such as rollers, a gear system, etc. The heating system 120 can comprise a radiating heater, and further an air circulation fan. The heating system can also have connectors 120, which can be of electric wire or pipes/tubes for blowing air. The heating system can also provide cooling or a means to regulate or reduce the temperature and can function as a temperature control system. Further, the temperature control system can include without limitation one or more of a heater, coolant, a fan, a blower, or the like.

The feeding channel 106 is made of a material having low thermal conductivity, such as for example Teflon. The system can further include a first dispensing nozzle 107 preferably made of a material having a thermal conductivity greater than 25 W/(m·K), such as for example brass or similar metallic alloys. The first dispensing nozzle 107 can be heated to a temperature sufficiently high for the filament 102 to liquify. Heating elements 108, in the form of a resistance heating tape or sleeve, and a temperature sensor (not shown) can be arranged around a lower portion of the nozzle 107 to regulate the temperature of the nozzle 107 to a temperature of approximatively between 200° C. to 240° C. to convert a leading portion of the filament 102 into a flowable fluid state. The solid (un-melted) portion of the filament 102 inside the feeding channel 106 serves as a piston to drive the melted liquid for dispensing through a first discharge orifice 109. The drive motor (not shown) can be controlled to regulate the advancing rate of the filament 102 in the feeding channel 106 so that the volumetric dispensing rate of the fluid can be closely controlled.

As shown in the FIG. 1, the apparatus further includes a supply means 110 of crafting medium 111, such as for example a metal clay or a ceramic clay. In a preferred embodiment of the invention, the crafting medium 111 comprises microscopic metal particles of metals such as silver, gold, copper or alloys or combinations thereof, mixed with an organic binder and water. The supply means 110 is preferably shaped as a conventional clay extruder comprising a cylindrical cavity and valve means 112 to control and regulate the flow of crafting medium toward a second dispensing nozzle 113 and through a second discharge orifice 114.

Both nozzles 107 and 113 are arranged at a predetermined distance from an object supporting platform 115. The dual printhead and the platform 115 are moved relative to one another in a movement pattern corresponding to the parameters of the predetermined object 117. The fused filament is deposited through the first discharge orifice 109 while the dual printhead is moving in an X-Y-plane relative to the platform 115, to build one layer of a mold 116. Thereafter, the crafting medium 111 is deposited while the dual printhead is moving in an X-Y-plane relative to the platform 115 to fill the layer of the mold 116 that has just been deposited.

The crafting medium 111 is in paste form. The layer of the crafting medium is optimally dried immediately or as soon as possible after being deposited, and in an event before depositing of a further crafting medium layer. The system 100 can therefore include a heating system or drying apparatus 119, which can be connected on the printhead. The heating system is used for drying a paste of the crafting medium 111. By moving the heating system it is possible after finishing each layer of the object (both mold and paste), to repeatedly scan the printed layer and apply heat and air circulation to improve drying in a controlled way. The drying apparatus can comprise a radiating heater, and possibly an air circulation fan, which can facilitate better evenness in the drying and reduce risks for cracks and also reduce potential problems in the next steps.

Thereafter the dual printhead and the platform 115 are displaced in the Z-direction from one another by a distance corresponding to the thickness of a single layer so that the next layer can be deposited. The first and second dispensing nozzles 107 and 113 are used to deposit the fused filament and the crafting medium respectively and therefore alternate the deposition on a layer by layer basis, in such a manner that the mold is alternately built and then filled with crafting medium for each single layer. When the deposition is completed, the object 117 is embedded inside the mold 116. The mold 116 is subsequently removed to release the object 117. The removal step is preferably achieved by heating the mold 116 to a temperature of approximately 200° C. until the mold material is melts away from the object 117. If the object 117 is made of a metal clay paste, the metal contained in the object 117 is thereafter sintered to obtain a pure metal object. During the three-dimensional printing of these objects requiring support, a support edifice is also prepared simultaneously while printing the crafting material and mold on a layer by layer basis. The material used for the support edifice survives during the post processing. The mold material mixed with the structural additive is intended to survive the post processing steps and to prevent the individual parts such as the support edifice from fusing together with the desired objects. In alternative embodiments where the final object comprises two or more non-connected, but interspersed objects, e.g. such as freely moveable links of a chain, the structural additive mixed with the mold material prevents the fusing of the two or more parts of the object.

A first supply of filament material used to build the mold. The supply of filament can comprise a rotatable spool on which the filament is wound. Such a filament material can comprise, but is not limited to, one or more of the following materials including various waxes, thermoplastic polymers, thermoset polymers, and combinations thereof. However, the primary modeling material preferably comprises an organic polymer with structural additive. As described above, the mold material can be acrylonitrilebutadiene-styrene (ABS), Polylactic acid (PLA), or any polymeric or plastic material with the structural additive such as metal, charcoal particles, ceramic, or other particles. The filament material is preferably a thermoplastic polymer that softens and liquifies for easy deposition and which rapidly cools and hardens to provide a suitable mold. Thermoplastic polymers useful for forming the mold from the filament material can include the following: poly(propylene), poly(styrene), poly(lactic acid) (PLA), acrylonitrilebutadiene-styrene (ABS), polycarbonate abs (PC-ABS), nylon, poly(carbonate), poly(phenyl sulfone), ultem, poly(ethylene), acrylic [poly(m-ethyl methacrylate)], poly(benzimidazole), poly(ether sulfone), poly(etherether ketone), poly(etherimide), poly(phenylene oxide), poly(phenylene sulfide), poly(vinyl chloride), poly(vinyldiene fluoride), poly(acetal), poly(vinyl acetate), poly(vinyl butyrate), poly(vinyl alcohol), poly(4-hydroxystyrene), poly(vinyl formate), poly(vinyl stearate), poly(acrylamide), poly(caprolactone), chitosan and combinations thereof. The structural additive is selected from the group consisting of metals, charcoal particles, ceramics, or other particles.

A second supply of crafting medium can be in paste form. Such a medium can comprise silicone, a ceramic material or the like. The crafting medium is preferably a commercially available metal clay usually consisting of very small particles of metal such as silver, gold, bronze, or copper mixed with an organic binder and water commonly used in making jewelry, beads and small sculptures.

Figure 2A:
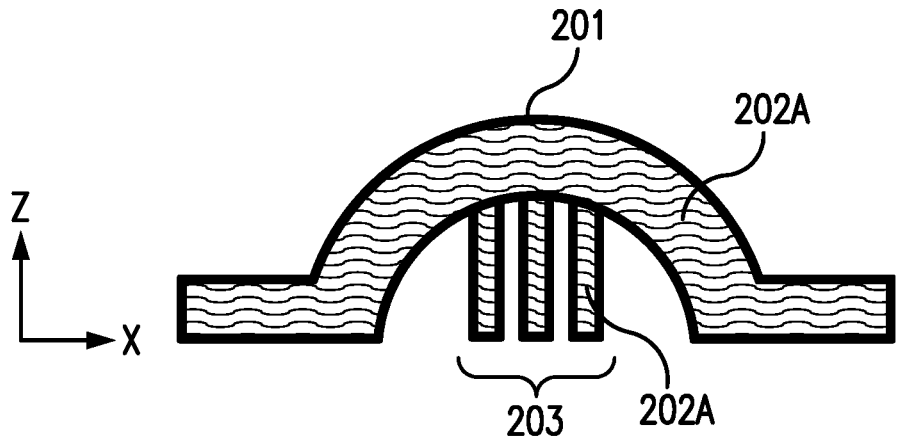
FIGS. 2A, 2B, 2C, and 2D depict cross-sectional representations of a three-dimensional object printed via a process in which a support edifice, i.e. support pillars, are printed and utilized during the various stages of the processing in accordance with the present invention.
Figure 2B:
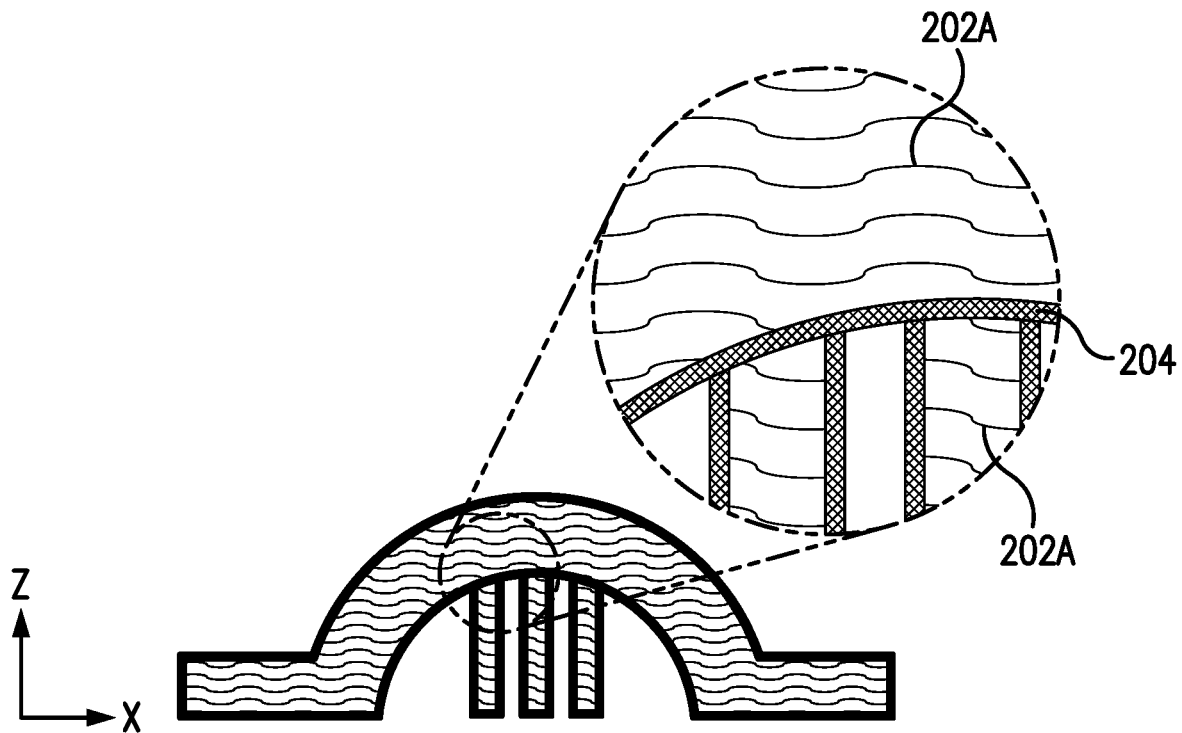
Figure 2C:
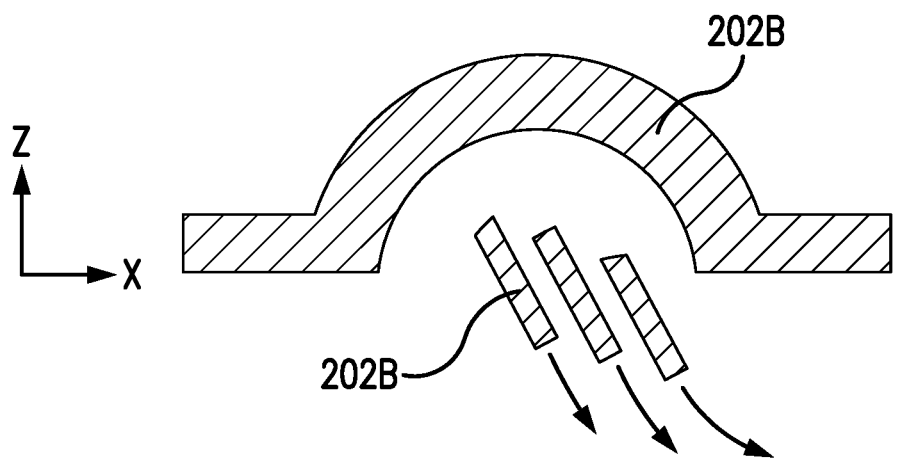
Figure 2D:
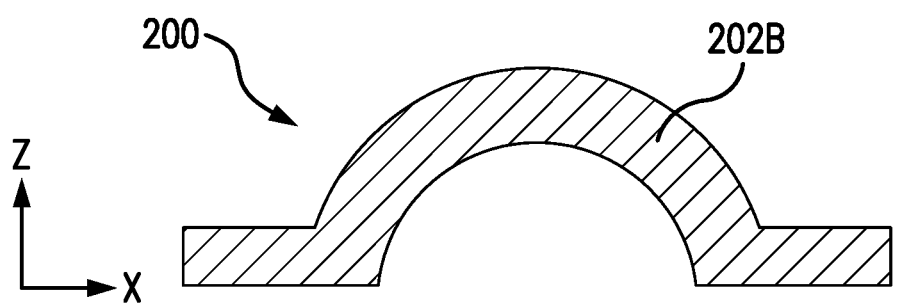

FIGS. 2A through 2D depict a representative three-dimensional object formation having a support edifice with support pillars at the various stages of the processing in accordance with the present invention. FIG. 2D depicts the target final object after printing, processing, and sintering and removal of the support edifice. The diagonal line hashing layer 202B is made up of crafting material after sintering. FIG. 2A depicts the object after it has been printed, but before any processing. Both the object and the mold layer are shown. The dark solid black layer 201 made up of molding material is indicated. The wavy layer 202A is made up of crafting material before sintering. The support structure 203 is prepared to support the three-dimensional object. FIG. 2B depicts the object after printing and removal of the mold, leaving the residual structural aid additive on the surfaces of both the object and the support edifice where the mold layer was previously present. The exploded close up illustration indicates that the support edifice 203 and the printed object still have remaining structural additive particles (checkered design 204) present on the surface even after the post processing. The structural additive present on the support edifice 204 prohibits fusing between the object and the support structure. FIG. 2C depicts the object after sintering with the support edifice being removed away from the object. The support edifice is easily removable because the structural additive has prevented the support edifice from fusing to the object. The support can easily be removed from the object by hand.

Figure 3:
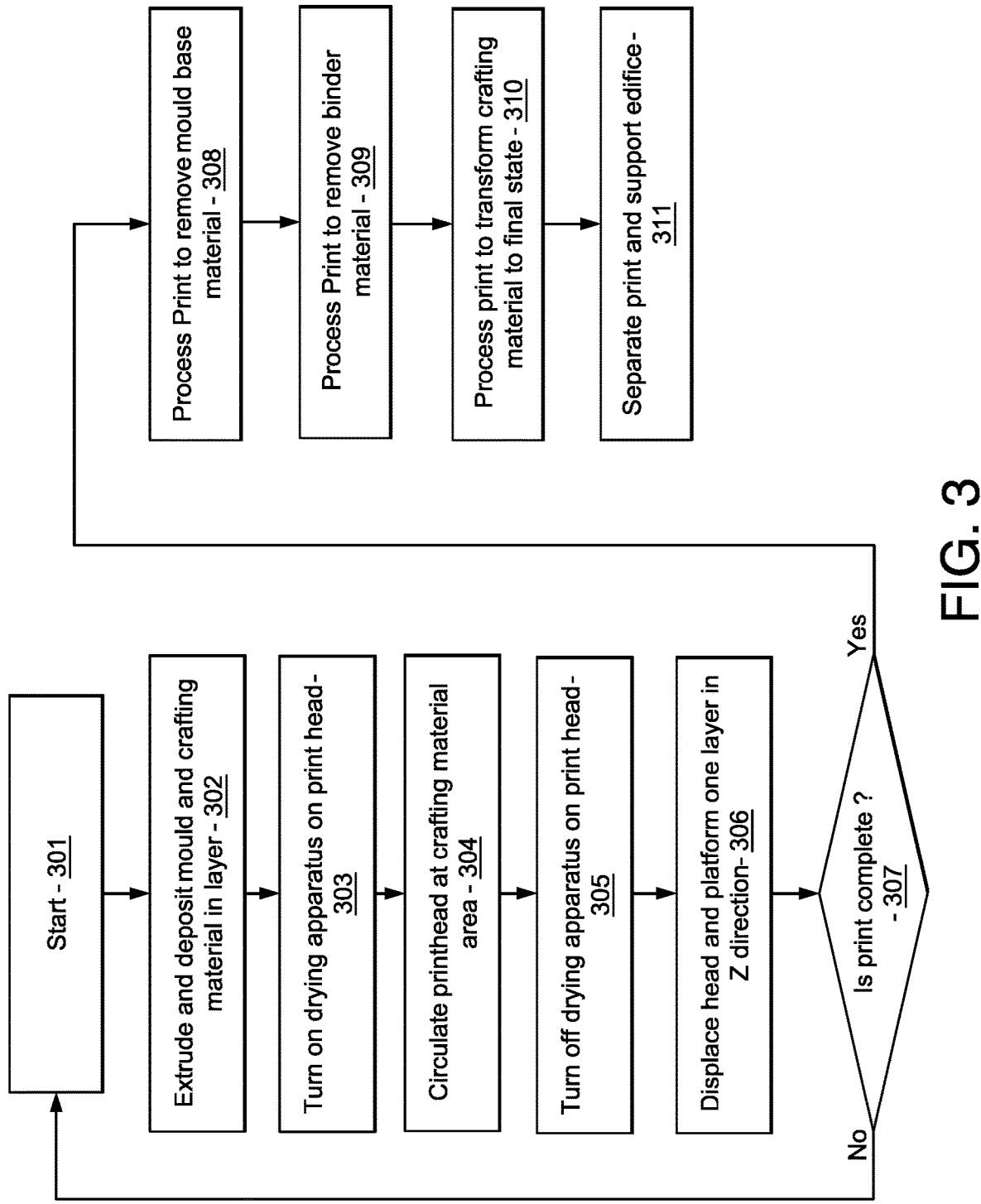
FIG. 3 illustrates by a flow chart an example of a method for drying a paste based crafting model during three dimensional printing.

FIG. 3 illustrates by a flow chart an example of a method for drying and processing a paste based crafting model during three dimensional printing. The process begins at the "Start" block 301. At block 302, the process comprises extruding and depositing a mold material (filament material) with structural additive and a crafting material in a layer by layer form. In block 302, there are several sub-steps involved (which are not depicted in the FIG. 3): such as providing a supply of mold building material in filament form; feeding the filament to enter one end of a flow passage of the first dispensing nozzle having a first discharge orifice on another end; heating the first dispensing nozzle to convert a leading portion of the filament therein to a flowable fluid; and dispensing the flowable fluid through the first discharge orifice to an object-supporting platform. Further, in block 302, there are several sub-steps involved: such as providing a supply of crafting medium in paste form; feeding the crafting medium to enter one end of a flow passage of the second dispensing nozzle having a second discharge orifice on another end; and during the dispensing step, operating the second dispensing nozzle for extruding the crafting medium on a layer.

At block 303, the drying apparatus or heating system 120 is turned on to dry the object. The heating system or drying apparatus can be an independent apparatus of can be connected on the printhead. Then in the next step at block 304, the heating or drying apparatus is scanned over the crafting material layer to dry the crafting material. After printing each layer of the object (both mold and paste), the heating system or drying apparatus can repeatedly scan the printed layer and apply heat and air circulation to improve drying in a controlled way. This controlled drying can enable better evenness in the drying and reduce risks for cracks and also reduces problems in the next steps. Then at block 305 the is an instruction to "Turn off" the heating system or drying apparatus 120.

Next at block 306, the dual printhead and the platform are displaced in the Z-direction from one another by a distance corresponding to the thickness of a single layer so that the next layer can be deposited. Next at block 307, if the printing of all of the layers has been completed, meaning that the crafted object and mold are complete then it moves to the next step, block 308. Otherwise, the process repeats again from block 301 until the desired object and associated support edifice are completed.

At block 308, the processing step involves the removal of the mold material. The post processing step can include heating at a high temperature so that the mold material is melted and removed. Upon melting and removal of the mold, the structural aid remains as a layer upon the structural edifice and the object where the mold layer had previously been located. The next processing step is to remove the binder material from the crafting material, block 309.

At block 310, the crafting material is transformed to the final finished product, for example, by sintering. During all the post processing steps, such as 308, 309, and 310, the support edifice and the structural additive to the mold material are unaffected. The structural additive is such that it prevents the fusing of the object with the support structure material. In other scenarios, the structural additive also prohibits the fusing between one part of the object with another part of the object to create a gap or space between them. At the final block 311, the support edifice can be separated out from the object.

Figure 4:
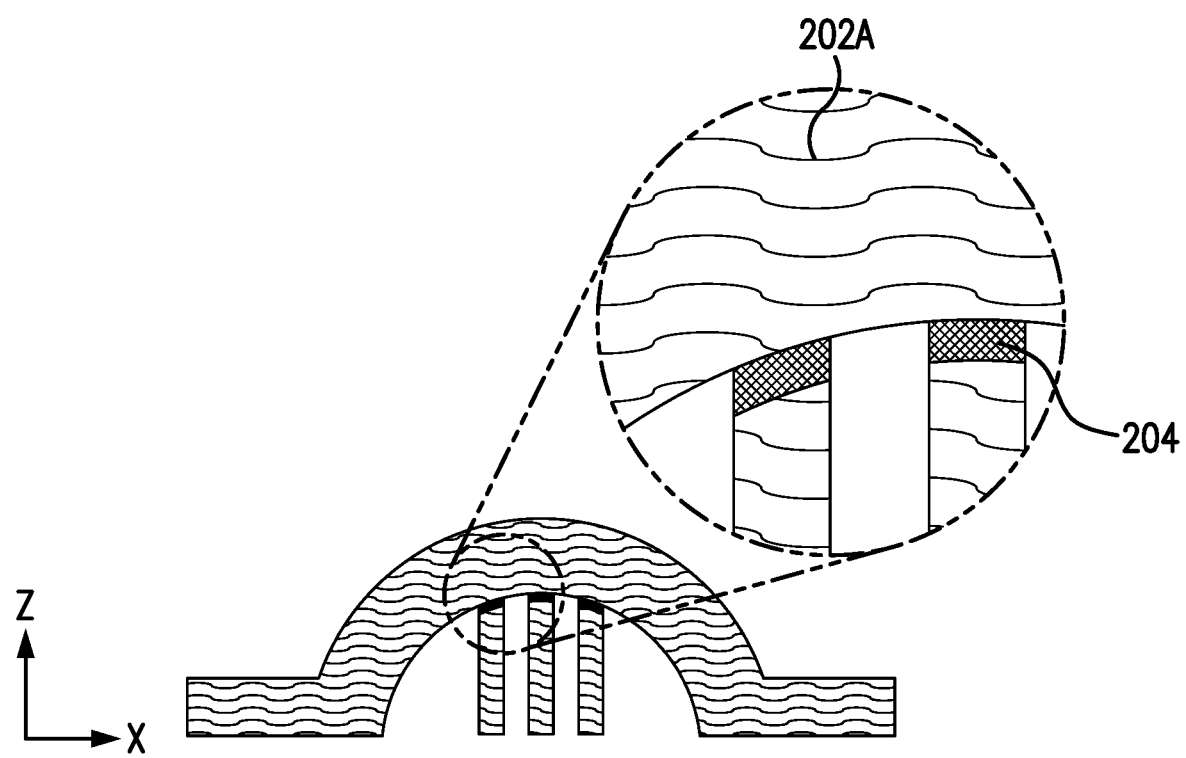
FIG. 4 illustrates an embodiment wherein some of the mold material has the structural additive where it is needed when in contact with the object, and where the structural additive is not needed, where it is only in contact with the structural edifice and not the object.

The inclusion of an additive in the mold material to prevent fusing of separate objects can also be implemented by having several mold material deposition mechanisms, where one mechanism is fed with a mold material with the structural additive and that mechanism is used where the additive is needed, and another mechanism for deposition of the mold material is fed with a mold material without the structural additive, and this mechanism is used where the structural additive is not needed. See FIG. 4 for illustration. The exploded close up illustration indicates that the support edifice 203 only has remaining structural additive particles (checkered design 204) at the contact point with the object.

In further embodiments of the present invention, the addition of a structural additive to the mold layer can be used to prevent the fusion during sintering of two objections that are being concurrently printed by three-dimensional printing techniques. In such a situation, one of the objections is not necessarily a support edifice. The two objects could be ones that are intertwined or interspersed between each other, or an object contained within another, where it is desired that the two objects remain separate and unattached to each other. An example of such an object would be two or more linked, but moveable chain links. In such a situation the components of the object are not fused to each other.

It should be understood that the support edifice is generally printed simultaneously on a layer-by-layer basis along with the object of manufacture. As described above the present invention relates to a support edifice for a three-dimensional object printed from a crafting medium, said support edifice comprising: (a) one or more mold layers, (b) one or more corresponding crafting medium layers, wherein each of the one or more mold layers of (a) substantially contains a corresponding crafting medium layer (b) of the support edifice, wherein at least one of the mold layers substantially covers one or more contact points of the support edifice with the three-dimensional object, and wherein each of the mold layers comprises a structural additive that substantially prevents fusing of the support edifice to the object during subsequent sintering of the object.

It would be understood to one of skill in the art that the one or more contact points of the support edifice include the covering or coating that the one or more mold layers provide, such that the one or more mold layers provides the contact with the object to be manufactured or a mold layer that is in contact with the object to be manufactured. This contact of the support edifice and the object of manufacture is thus through one or more mold layers, which contain the structural additive. This feature is important, because when the mold layer is removed through subsequent processing of the printed object and its structural edifice, the structural additive used in the mold layer would remain and would be the point of contact between the support edifice and the manufactured object. Upon sintering this remaining structural additive would thus prevent fusion of the structural edifice to the object of manufacture, thus permitting easy removal of or separation of the support edifice from the article of manufacturing, for example, by simply breaking away the support edifice, as illustrated in FIG. 2D. Again, an analogous situation is obtained for printing an object comprising two or more non-connected components, such as links of a chain.

The present invention relates to a three-dimensional imaging process for making objects, preferably metal objects or ceramic objects, on a layer-by-layer basis under the control of a data processing system. Some of the process steps which are not included above in detail are: (a) providing a dual printhead including a first dispensing nozzle and a second dispensing nozzle; (b) during the dispensing step, moving the dual printhead and the object-supporting platform relative to one another in a plane defined by first and second directions and in a third direction orthogonal to said plane to form the flowable fluid into a three-dimensional hollow pattern having a molding cavity shaped in accordance with a predetermined three dimensional object; (c) on a layer by layer basis through the second discharge orifice onto the three-dimensional hollow pattern to gradually fill the molding cavity, thereby forming the predetermined three-dimensional object; and (d) removing the three-dimensional hollow pattern in order to release the predetermined three-dimensional object.

EXAMPLES

The following examples further described and demonstrate embodiments within the scope of the present invention. The Examples are given solely for purpose of illustration and are not to be construed as limitations of the present invention, as many variations thereof are possible without departing from the spirit and scope of the invention.

Crafting Medium

Although a wide variety of crafting media can be used with the methods and systems of the present invention, a particularly useful crafting medium contains a very low concentration of the binder organic base materials, such as starches, cellulose, cellulose derivatives, agar, etc., and around 15 to 60 volume % water. The binding organic base material content can be varied from 1 to 10 volume %. The binder can act as glue between the powder particles, and also as filler between the particles. The method of preparation of the three-dimensional object also includes the step of drying on a layer-by-layer basis. The drying is a continuous process in the present invention and can remove most of the water and/or other solvents or carriers from the binder composite material from each layer after depositing.

An exemplary crafting material useful herein comprises:
(i) from about 40% to about 80% by volume basis of a powder selected from metal powders, ceramic powders, and combinations, thereof;
(ii) from about 0.5% to about 10% by volume of a binder; and
(iii) from about 15% to about 60% by volume of an aqueous solvent.

An exemplary crafting material useful herein comprises:
(i) from about 40% to about 80% by volume basis of a powder selected from metal powders, ceramic powders, and combinations, thereof;
(ii) from about 0.5% to about 10% by volume of a binder; and
(iii) from about 15% to about 60% by volume of a non-aqueous solvent.

Another crafting material useful herein comprises,
(i) from about 60% to about 70% by volume basis of a powder;

(ii) from about 1% to about 5% by volume of a binder; and
(iii) from about 25% to about 35% by volume of an aqueous solvent.

Another crafting material useful herein comprises,
(i) from about 60% to about 70% by volume basis of a powder;
(ii) from about 1% to about 5% by volume of a binder; and
(iii) from about 25% to about 35% by volume of a non-aqueous solvent.

The solvent or carrier for the crafting material can be an aqueous solvent. Such an aqueous solvent can be solely or primarily water, or can comprise other solvent materials which are generally water miscible. In other embodiments, a nonaqueous solvent or mixtures of non-aqueous solvents can be employed. Such non-aqueous solvents can be selected from the group consisting of methanol, ethanol, 1-propanol, 2-propanol, acetone, acetaldehyde, ethyl acetate, C2-C4 diols, glycerol, acetonitrile, C4-alcohols, 2-ethoxyethanol, 2-ethyl hexanol, 1,2-dichloroethane, diisopropyl amine, isoamyl alcohol, propyl acetate, isopropyl acetate, and mixtures thereof. Also, contemplated are azeotropes.

Several materials can be used as the leaving component, i.e. the solvent or carrier, in the deposition technique involving continuous, layer-by-layer drying. One example of a departing component is water, with a vapor pressure of about 2.4 kPa. Higher vapor pressures may in general be preferred, as they will require less energy to drive them away from the deposited part. However, including materials with vapor pressures which are very high as compared to water (acetaldehyde, for example) may cause difficulties with layer-to-layer and strand-to-strand bonding if the leaving component departs prior to the formation of a significant bond. In this case controlled drying, can be achieved via depression of the print temperature and can be employed during forming of the part. After forming of the part, the temperature (or other thermodynamic variables) may be changed to complete the removal of the leaving component.

Solvents used can be aqueous (e.g., water, and water with salts or surfactants), organic and primarily carbon based, organic with halogen groups, organic with large amounts of fluorine, or mixtures of any of those aforementioned items. Mixtures of components can be chosen such that when the components leave the part, the components leave in a proportion identical or substantially similar to the proportion of the components in the deposited material.

In addition to the list provided below, materials such as dichloroethane, diiodoethane, fluorinated or chlorinated refrigerants, or degreaser materials as manufactured by DuPont (Operteron) or MicroCare (Tergo) may be used. Further, solvent drying specialty fluids added to liquids such as water or ethanol (and their mixtures), such as Vertrel XP10 Solvent Drying Specialty fluid by MicroCare, can be used.

In the three-dimensional printing process it is generally necessary to use the crafting medium in conjunction with binders to provide rigidity to the object during fabrication. Different types of binding materials are used in three-dimensional printing processes. Organic binders, such as epoxy, polyurethane, agar-agar, starch, cellulosic materials, Agar (E406), Alginic acid (E400), Sodium alginate (E401), Carrageenan (E407), Gum arabic (E414), Gum ghatti, Gum tragacanth (E413), Karaya gum (E416), Guar gum (E412), Locust bean gum (E410), Beta-glucan, Chicle gum, Dammar gum, Glucomannan (E425), Mastic gum, Psyllium seed husks, Spruce gum, Tara gum (E417), Gellan gum (E418), Xanthan gum (E415), polyethylene oxide, polycarboxylate etherylic acids (polyacrylic acid), polycarboxylate etherylates, polyvinyl alcohol, cellulose gum (Aquacel GSA and Aquacel GSH), hydroxymethyl cellulose, hydroxypropyl cellulose, Carboxymethyl cellulose, etc. can be used while inorganic binders, such as magnesium oxides, magnesic, cement, sorel cement, salts, etc. are used. With the three-dimensional objects with a powder plus binder constitution for sintering there can be several problems. The binder can be difficult to remove because it needs to be dissolved or burned out after the object is finished. The binder can also be hazardous and could require toxic substances to dissolve it. While removing the binder there is a risk for cracks and deformities in the resulting object. Further, methods of three-dimensional printing using clay or ceramic materials and preparing molding are also well known in the prior art documents. Most of these prior art documents discuss the drying or heating of the mold or clay paste post processing. Problems such as cracking and unevenness can arise when the drying is carried out at the end of the processing. The present invention is also providing solution to solve the cracks and unevenness of the object.

A solution to this problem is achieved in the present patent application by providing a crafting medium comprising a metal or ceramic, binder organic base materials, and water. The crafting medium which is in the paste form includes 40 volume %-80 volume % metal/ceramic powder, 1 volume %-10 volume % organic base material, and 15 volume %-60 volume % water. The metal or ceramic powder particle size is in the range from 0.1-100 micrometers.

In another embodiment of the invention, the crafting medium comprises of microscopic particles of metal, such as silver, gold, copper, tin, nickel, chromium, zinc, tungsten, cobalt, aluminum, molybdenum, boron, iron, titanium, vanadium, niobium, silicon, manganese, steel or alloys or combinations thereof, and also oxides from these metals, mixed with the binder organic base material and water. Also additional corrosion inhibitors, sintering aids or lubrication additives in the range of 0.1-2 volume % can be added.

In another embodiment, the powder is instead a ceramic powder such as silicon carbide, boron carbide, aluminum carbide, tungsten carbide, titanium carbide, tantalum carbide, silicon nitride, boron nitride, aluminum nitride, titanium nitride, zirconium nitride, steatite, forsterite, alumina, zircon beryllia, magnesia, mullite, cordierite, aluminum titanate and zirconia mixed with the binder organic base material and water. Also additional corrosion inhibitors, sintering aidis or lubrication additives in the range of 0.1-2 volume % can be added.

In such embodiments, the binder organic base material can be polyurethane, agar-agar, starch, cellulosic materials, Agar (E406), Alginic acid (E400), Sodium alginate (E401), Carrageenan (E407), Gum arabic (E414), Gum ghatti, Gum tragacanth (E413), Karaya gum (E416), Guar gum (E412), Locust bean gum (E410), Beta-glucan, Chicle gum, Dammar gum, Glucomannan (E425), Mastic gum, Psyllium seed husks, Spruce gum, Tara gum (E417), Gellan gum (E418), Xanthan gum (E415), polyethylene oxide, polycarboxylate etherylic acids (polyacrylic acid), polycarboxylate etherylates, polyvinyl alcohol, cellulose gum (Aquacel GSA and Aquacel GSH), hydroxymethyl cellulose, hydroxypropyl cellulose, Carboxymethyl cellulose, or combinations thereof.

Sintering aids such as salts, gum rosin or pine rosin, isopropyl alcohol, Propylene glycol, Copper oxides, other metal oxides, low melting point metals or alkaline earth metals can be used. Lubricant aids such as essential oils, glycerin, zinc stearate or other stearates, carbon black, silica and ferrous oxide can be used. Corrosion inhibitors such as from the group consisting of the nitrate of lithium, sodium, potassium, calcium, magnesium, zinc, cobalt, iron, chromium, and copper, and the nitrite of lithium, sodium, potassium, calcium, magnesium, zinc can be used.

With the compositions and processes of the present invention, substantially all of the moisture, i.e. the water, and other solvent or carrier components for the binder of the crafting medium is removed immediately after deposition of each layer by use of the drying apparatus. By "substantially all of the moisture" is meant that at least about 90% by weight, and in further embodiments at least about 95% by weight, and yet in further embodiments at least about 99% by weight of the water and other solvent or carrier components are removed. This novel method of three-dimensional object building does not require the use of a post-processing debinding step. Further, the present invention also provides a system for drying a paste based crafting model during three-dimensional printing and method thereof. The drying apparatus or the heating system is connected to the moving print head. This makes drying possible after finishing each layer of the object (both mold and paste), the print head can repeatedly scan the printed layer and apply heat and air circulation to improve drying in a controlled manner.

Example 1: Crafting Medium and Process for Making

A crafting medium comprising the following components was prepared. The components are each on a volume % basis.
  Stainless steel powder 17-4: 62%
  Distilled water: 32%
  Arrow root powder: 4%
  Xanthan gum 1%
  Polycarboxylate etherylate 1%
A premix of the water and arrow root is prepared by heated to 80° C. with stirring. The premix is then cooled to room temperature. A separate premix of xanthan gum and the polycarboxylate etherylate is made by combining them with stirring to form a thick paste. Next, the stainless steel powder and the xanthan gum premix are added to the arrow root premix and combined using a mechanical stirrer.

The resulting paste is useful for three-dimensional printing. The paste can be printed on a line-by-line and layer-by-layer basis in conjunction with a mold layer. Each deposited paste layer is dried according to the present invention. The resulting three-dimensional object is then subsequently debound and then sintered to provide the stainless steel three-dimensional object.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the methods and systems of the present invention, where the term comprises is used with respect to the recited steps of the methods or components of the compositions, it is also contemplated that the methods and compositions consist essentially of, or consist of, the recited steps or components. Furthermore, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances a composition can be described as being composed of the components prior to mixing, or prior to a further processing step such as drying, binder removal, heating, sintering, etc. It is recognized that certain components can further react or be transformed into new materials.

All percentages and ratios used herein are on a volume (volume/volume) or weight (weight/weight) basis as shown, or otherwise indicated.

What is claimed is:

1. A support edifice for a three-dimensional object printed from a crafting medium, said support edifice comprising:
  (a) one or more mold layers,
  (b) one or more corresponding crafting medium layers,
  wherein each of the one or more mold layers (a) substantially contains a corresponding crafting medium layer and defines at least a portion of an outer contour of the crafting medium layer and (b) a layer of the support edifice,
  wherein at least one of the mold layers substantially covers one or more contact points of the support edifice with the three-dimensional object, and
  wherein each of the mold layers comprises a structural additive that substantially prevents fusing of the crafting medium of the support edifice to the crafting medium of the object during subsequent sintering of the object.

2. The support edifice according to claim 1 prior to sintering.

3. The support edifice according to claim 1 wherein the mold layer comprises a thermoplastic polymer.

4. The support edifice according to claim 1 wherein the structural additive is selected from the group consisting of metal particles, ceramic particles, charcoal particles and combinations thereof.

5. The support edifice according to claim 4 wherein the metal particles are selected from silver, gold, copper, tin, nickel, chromium, zinc, tungsten, cobalt, aluminum, molybdenum, boron, iron, titanium, vanadium, niobium, silicon, manganese, steel, metal alloys, and combinations thereof.

6. The support edifice according to claim 4 wherein the ceramic particles are selected from silicon carbide, boron carbide, aluminum carbide, tungsten carbide, titanium carbide, tantalum carbide, silicon nitride, boron nitride, aluminum nitride, titanium nitride, zirconium nitride, steatite, forsterite, alumina, zircon beryllia, magnesia, mullite, cordierite, aluminum titanate, zirconia, and combinations thereof.

7. The support edifice according to claim 1, wherein said mold layer has a skin thickness from about 0.1 to about 10 mm.

8. The support edifice according to claim 1, wherein said mold layer comprises one or more perforations.

9. The support edifice according to claim 8 wherein said perforations have a diameter from about 0.4 mm to about 1 mm.

10. The support edifice according to claim 1 wherein the crafting medium comprises:
(i) from about 40% to about 80% by volume basis of a powder selected from metal powders, ceramic powders, and combinations, thereof;
(ii) from about 0.5% to about 10% by volume of a binder; and
(iii) from about 15% to about 60% by volume of an aqueous solvent.

11. The support edifice according to claim 1 wherein the crafting medium comprises:
(i) from about 40% to about 80% by volume basis of a powder selected from metal powders, ceramic powders, and combinations, thereof;
(ii) from about 0.5% to about 10% by volume of a binder; and
(iii) from about 15% to about 60% by volume of a non-aqueous solvent.

12. An object prior to sintering prepared by three-dimensional printing comprising:
(I) a main object body, and
(II) one or more support edifices,
(i) wherein said main object body (I) comprises:
(Ia) one or more mold layers, and
(Ib) one or more corresponding crafting medium layers,
wherein each of the one or more mold layers (Ia) substantially contains a corresponding crafting medium layer and defines at least a portion of an outer contour of the crafting medium layer (Ib) of the main object body; and
(ii) wherein said one or more support edifices (II) comprise
(IIa) one or more mold layers, and
(IIb) one or more corresponding crafting medium layers,
wherein each of the one or more mold layers (IIa) substantially contains a corresponding crafting medium layer (IIb) of the support edifice,
wherein at least one of the mold layers (IIa) substantially covers one or more contact points of the support edifice with the three-dimensional object, and
wherein each of the one or more mold layers (IIa) for the support edifice (IIb) comprises a structural additive that substantially prevents fusing of the support edifice (II) to the main object body (I) during subsequent sintering of the object.

13. The object according to claim 12 wherein the crafting medium comprises:
(i) from about 40% to about 80% by volume basis of a powder selected from metal powders, ceramic powders, and combinations, thereof;
(ii) from about 0.5% to about 10% by volume of a binder; and
(iii) from about 15% to about 60% by volume of an aqueous or non-aqueous solvent.

14. A method for three-dimensional printing of a support edifice for a three-dimensional object comprising
(a) depositing a mold layer from a print head,
(b) depositing a layer of a crafting medium with a print head within the confines of the mold layer wherein the mold layer defines at least a portion of an outer contour of the layer of crafting medium,
(c) depositing a mold layer that substantially covers one or more contact points of the support edifice with the three-dimensional object;
wherein each of the mold layers comprises a structural additive that substantially prevents fusing of the support edifice to the object during subsequent sintering of the object.

15. The method according to claim 14 wherein the crafting medium comprises:
(i) from about 40% to about 80% by volume basis of a powder selected from metal powders, ceramic powders, and combinations, thereof;
(ii) from about 0.5% to about 10% by volume of a binder; and
(iii) from about 15% to about 60% by volume of an aqueous or non-aqueous solvent.

16. A method for three-dimensional printing of an object comprising a support edifice, comprising:
(a) depositing a mold layer from a print head to define a mold for the object and the support edifice,
(b) depositing a layer of a crafting medium with a print head within the confines of the mold layer for the object and the support edifice,
(c) repeating steps (a) and (b) until the final layer of the crafting medium and mold layer is deposited within the confines of the mold for the object and support edifice wherein the mold layer substantially covers the terminal layer of the crafting medium representing the contact point for the support edifice with the object and now representing a mold layer for the object, wherein the mold layers define an outer contour of the layers of crafting medium;
(d) depositing a further layer of crafting medium within the confines of the mold; and
(e) depositing further layers of mold and crafting medium to complete the object.

17. The method according to claim 16 wherein the crafting medium comprises:
(i) from about 40% to about 80% by volume basis of a powder selected from metal powders, ceramic powders, and combinations, thereof;
(ii) from about 0.5% to about 10% by volume of a binder; and
(iii) from about 15% to about 60% by volume of an aqueous solvent.

18. The method according to claim 16 wherein the crafting medium comprises:
(i) from about 40% to about 80% by volume basis of a powder selected from metal powders, ceramic powders, and combinations, thereof;
(ii) from about 0.5% to about 10% by volume of a binder; and
(iii) from about 15% to about 60% by volume of a non-aqueous solvent.

19. An object prior to sintering prepared by three-dimensional printing comprising two or more separate subobjects:
(I) a first subobject, and
(II) one more additional subobjects,
(i) wherein said first subobject (I) comprises:
(Ia) one or more mold layers, and
(Ib) one or more corresponding crafting medium layers,
wherein each of the one or more mold layers (Ia) substantially contains and defines an outer contour of the layer of a corresponding crafting medium layer (Ib) of the subobject; and
(ii) wherein said one or more additional subobjects (II) comprise
(IIa) one or more mold layers, and
(IIb) one or more corresponding crafting medium layers of the additional subobject,
wherein each of the one or more mold layers (IIa) of the one or more subsubjects substantially contains a corresponding crafting medium layer (IIb) of the one or more subobjects; and
wherein at least one of the mold layers (Ia) or (IIa) substantially covers one or more proximity points of the subobject (I) or the one or more additional subobjects (II) with each other and the subobject (I); and
wherein each of the one or more mold layers (Ia) or (IIa) comprises a structural additive that substantially prevents fusing of the subobject (I) with the one or more subobjects (II) and with each other during subsequent sintering of the object.

20. A support edifice for a three-dimensional object printed from a crafting medium, said support edifice comprising:
(a) one or more mold layers, and
(b) one or more corresponding crafting medium layers,
wherein each of the one or more mold layers of (a) substantially contains and defines an outer contour of a corresponding crafting medium layer (b) of the support edifice,
wherein at least one of the mold layers substantially covers one or more contact points of the support edifice with the three-dimensional object, and
wherein said at least one or more of the mold layers that substantially covers one or more contact points of the support edifice with the three-dimensional object comprises a structural additive that substantially prevents fusing of the crafting medium of the support edifice to the crafting medium of the object during subsequent sintering of the object.

* * * * *